May 20, 1941.  H. DE SMITH  2,242,514
SCORING KNIFE
Filed April 29, 1939   2 Sheets-Sheet 1

INVENTOR.
Henry De Smith
BY
D. Clyde Jones
His ATTORNEY.

May 20, 1941. H. DE SMITH 2,242,514

SCORING KNIFE

Filed April 29, 1939 2 Sheets-Sheet 2

INVENTOR.
Henry De Smith
BY D. Clyde Jensen
his ATTORNEY.

Patented May 20, 1941

2,242,514

UNITED STATES PATENT OFFICE 2,242,514

SCORING KNIFE

Henry De Smith, Rochester, N. Y., assignor to M. D. Knowlton Company, Rochester, N. Y., a corporation of New York Application April 29, 1939, Serial No. 270,874

2 Claims. (Cl. 164—70)

This invention relates to scoring knives and particularly to an improved journal construction for supporting the scoring blade.

In prior journal constructions of this character it has, for example, been the practice to rotatably support the circular scoring blade by means of a journal having a head on one end and screw threads on the external surface at the other end thereof. The threaded end of the journal engaged an internally threaded hole formed in one leg of the blade holder. The journal was non-rotatably fixed to the holder by means of a clamp screw. While this construction has proven practical over a period of many years, the adjustment of the journal in the holder was limited, and the journal and clamp screw had to be made extremely accurate so that the blade was free to turn on the journal while at the same time the journal was non-rotatably held in the holder. Due to the constant upward pressure exerted by the scoring blade, almost all of the wear occurred on the lower half of the bearing surface of the journal, but since the threaded journals were capable of only limited rotary adjustment it was necessary to replace the journal after a period of use even though the upper half of its bearing surface was not appreciably worn. Prior journal constructions also had the disadvantage that the only means for securing the journal against rotation was the clamping action of a clamp screw. If the clamp screw were accidentally loosened or improperly tightened in assembling the scoring blade and holder, the journal would tend to rotate with the result that the parts would loosen and the scoring knife would not run true.

It is accordingly an object of this invention to provide an improved journal construction for scoring knives wherein interlocking means prevent the journal from rotating or turning in its holder, thus insuring proper alinement of the parts at all times.

It is another object of this invention to provide an improved journal construction wherein the journal on which the scoring blade is supported, may be turned 180° in its holder, whereby each half of the journal bearing surface may be utilized before it is necessary to replace the same.

It is a still further object of this invention to provide a simpler journal construction, which is easier to assemble and adjust, and which provides bearing support throughout the full width of the scoring knife carried thereon insuring correct alinement of the scoring blade at all times.

These and other objects will be apparent from the description and claims when taken with the drawings in which:

Figure 1:
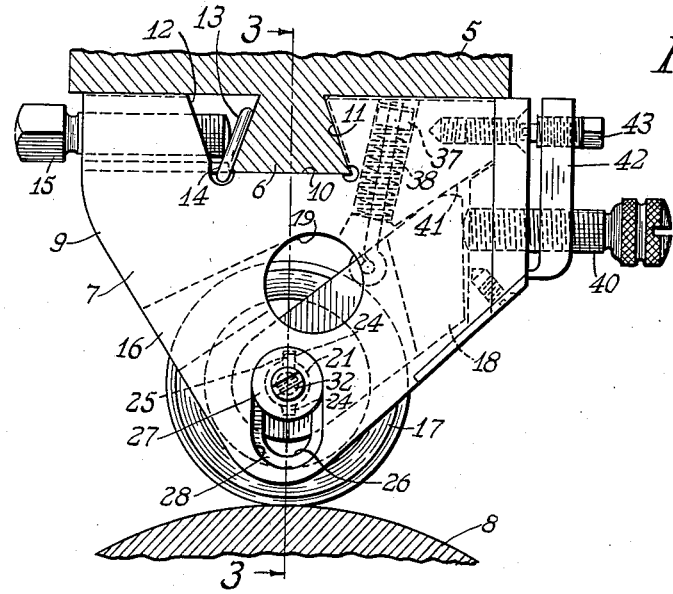
Fig. 1 is a face view of a scoring knife made in accordance with the present invention, the scoring machine frame and a fragment of the scoring roll being shown in section.

Referring to Figs. 1 to 4 inclusive, there is shown a fragment of a scoring machine frame 5 provided with a gib 6 on which a scoring knife, generally indicated 7, is removably and adjustably clamped. Reference character 8 indicates a fragment of a scoring roll which is suitably journaled in the scoring machine. The details of the machine are well known and form no part of the present invention and therefore a detailed description and showing thereof need not be made.

The scoring knife 7 comprises the bifurcated frame 9 having a transverse slot 10 at the top. This slot is undercut as indicated at 11, at an angle corresponding to the complementary wall of the gib 6, while the other wall 12 of the slot, is cut away so that the frame 9 may be readily applied to the gib 6. The frame 9 is clamped to the gib by means of the plate 13 which is pivotally connected to the frame 9 as indicated at 14. This plate is forced into clamping engagement with the gib by means of the screw 15 whereby the scoring knife is rigidly secured to the machine frame.

As mentioned above and as particularly shown in Figs. 2 and 3, the frame 9 is bifurcated, providing the brackets 16 between which the scoring blade 17 and the blade holder 18 therefor are mounted for vertical adjustment. For convenience in assembling these parts, the frame 9 may have holes 19 formed therein.

The blade holder 18 is also bifurcated, having legs 20, and supports the journal 21 on which the scoring blade 17 is rotatably mounted. The journal 21 is slidably mounted in the alined holes 22 and 23 provided in the legs 20 of the holder. The hole 22 is non-circular, having opposed slots 24 communicating therewith, which slots selectively receive the pin 25, fixed to the journal, to prevent the journal from rotating in the holder. When the lower half of the journal, which takes practically all of the wear from the blade, becomes worn, it is only necessary to withdraw the journal from the holder, turn it 180° and replace it in the holder.

Figure 2:
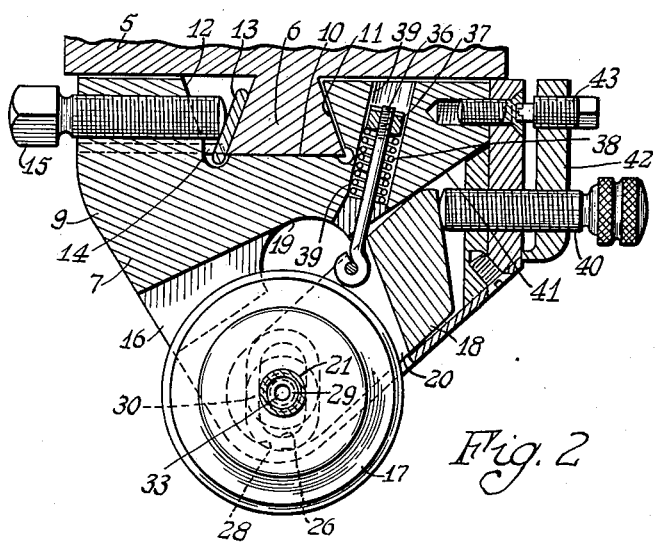
Fig. 2 is a vertical section of the scoring knife shown in Fig. 1, this view being taken on a substantially central plane parallel to the face of the scoring knife.
Figure 3:
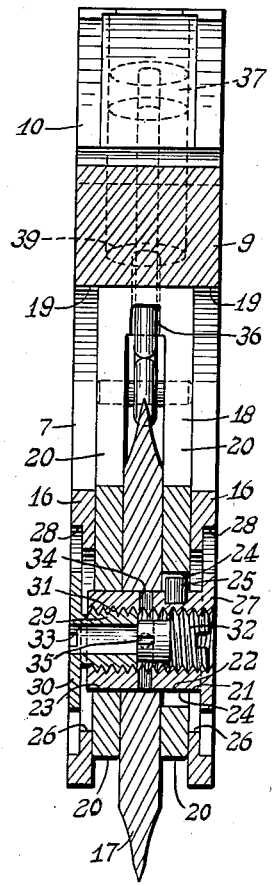
Fig. 3 is a vertical section taken on line 3—3 of Fig. 1, the machine frame and scoring roll being omitted.
Figure 4:
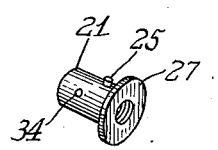
Fig. 4 is a perspective view of the journal proper.

The brackets 16 of the frame 9 are provided with a pair of alined countersunk slots 26 which extend vertically when the scoring knife is in operative position as shown in Fig. 1. As will appear later, these slots guide the movement of the scoring blade in a vertical direction so that at all times, whether the scoring blade is in its raised position as shown in Fig. 1 or in an intermediate position as shown in Figs. 2 and 3, it will always contact the high point of the scoring roll. Stated in another way, a line extending between the center of the scoring knife and the center of the scoring roll will be at right angles to the plane of the material being scored. In this manner scoring blades of different diameters, as when a blade becomes dull and is repeatedly reground, can be brought into proper working relation to the scoring roll. To guide the blade in this manner, the enlarged head 27 of the journal seats in the countersunk portion 28 of the slot 26 formed in one bracket of the frame 9 with the pin 25 engaging either of the slots 24 formed in the adjacent leg 20 of the holder. A clamp screw 29, having a disk-like head 30, corresponding to the head 27 of the journal, seats in the countersunk portion 28 of the slot formed in the other bracket 16 and engages the internal threads 31 formed in the journal. A set screw 32 may be screwed into the journal from the headed end thereof, into abutting relation with the clamp screw, as shown in Fig. 3, to maintain the clamp screw 29 and the journal 21 in their adjusted position. It will be noted that the clamp screw is provided with a hole 33 therethrough so that oil may be supplied to the oil holes 34 formed in the journal. The oil holes 34 communicate with the blade bearing surface of the journal. The end of the set screw 32 may be slotted as shown at 35, so that the oil may seep from the hole 33 into the mentioned oil holes.

The blade holder 18 is supported within the bifurcated portion of the frame and is normally urged upward by means of the rod 36 pivoted to the holder, which rod is provided with a nut 37 which engages the spring 38. This spring abuts the bottom of the well 39 formed in the frame 9 to normally urge the rod and the blade holder fixed thereto in an upward direction, as viewed in Figs. 1 to 3.

In order to adjust the blade 17 relative to the scoring roll 8, there is provided an adjusting screw 40 threaded through one side of the frame 9. This screw abuts the upper end of the blade holder 18 so that by turning the screw, the holder and blade may be raised or lowered, being guided by means of the vertical slots 26 and the inclined wall 41 of the frame 9. The adjusting screw 40 is locked in adjusted position by means of the plate 42 threaded thereon, which plate is provided with a screw 43 adapted to be forced against the side wall of the frame to cause the plate to bind on the threads of the adjusting screw. It will be understood that the clamp screw 29 is tightened sufficiently to prevent lateral movement of the blade on the journal while allowing the blade to turn freely on the journal and permitting the holder 18 to be adjusted on the frame 9.

The device described above is known as a "center" scoring knife, since the blade is disposed in the middle of the knife. It will be seen however, that when two or more scoring knives are used on a machine the distance between adjacent blades can be no less than the width of a scoring knife frame. To overcome this limitation, "offset" scoring knives are used where it is desired to provide closely spaced score lines in the material to be scored. These knives are similar to the center scoring knives except that the blade is positioned adjacent one side of the frame. The "offset" scoring knives are made right and left-hand so that the blades may be placed close together whereby closely spaced score lines may be made in the sheet material being scored.

Figure 5:
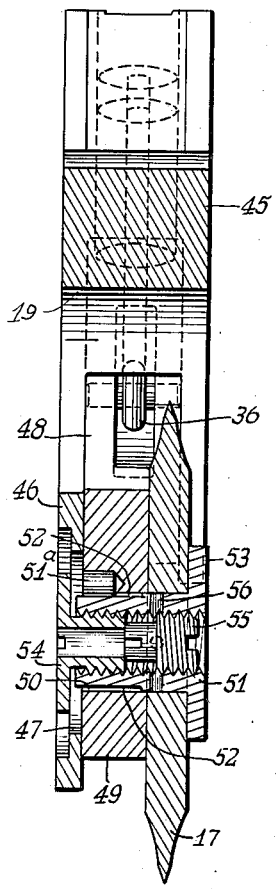
Fig. 5 is a vertical section similar to Fig. 3 but illustrating a modified form of the invention wherein the scoring blade is offset relative to the central plane of the scoring knife.
Figure 6:
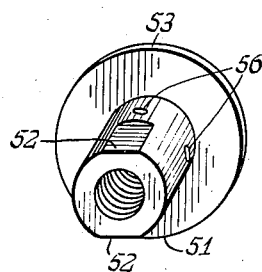
Fig. 6 is a perspective view of the journal used in the modified scoring knife shown in Fig. 5
Figure 7:
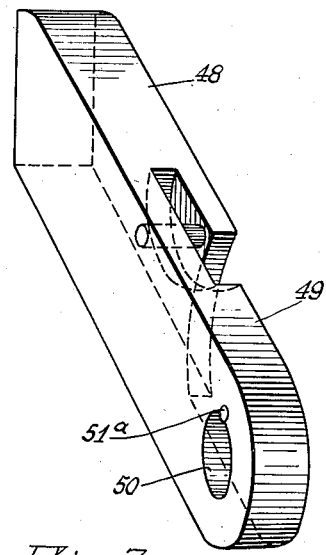
Fig. 7 is a perspective view of the blade and journal holder used in the modification shown in Fig. 5.

As shown in the modified device in Fig. 5 the present improved journal construction is applicable either to right or left-hand offset scoring knives. This modified device comprises a frame 45 which is similar to the frame 9 except that it has a single depending bracket 46 provided with a vertical, countersunk slot 47 which guides the movement of the blade and blade holder in the same manner as in the previously described knife. The modified blade holder 48, illustrated in perspective in Fig. 7, is similar to the holder 18 previously described, except that it has but a single leg 49 provided with a hole 50, which slidably receives the modified journal 51. It will be noted also that in this modification, the hole 50 is made non-circular by fixing a pin 51a in the holder 48, which pin may have a flattened side projecting into the hole 50 for selective engagement with either of the flat surfaces 52 of the modified journal 51. The head 53, of the journal 51 engages the outer face of the scoring blade 17 and is held in adjusted position by means of the clamp screw 54 which seats in the countersunk slot 47, and is locked in place by means of the set screw 55 threaded into the journal. The blade holder 48 and the scoring blade 17 rotatably mounted thereon are adjusted on the frame in the same manner as the previously described device and therefore the illustration of the adjusting screw 40 and the related parts have been omitted from the drawings. It will be seen that the bearing surface of the modified journal can be lubricated in the same manner as in the center scoring knife, since the oil holes 56 formed in the journal communicate through the slotted end of the set screw 55 with the bore of the clamp screw.

It will be noted that, in each of the constructions described above, the full width of the scoring blade is supported on the journal and that the journal can be turned 180° to compensate for wear and held against rotation by means of the non-circular hole and the complementary part of the journal. The present construction also simplifies adjustment of the journal and its associated parts to insure proper clearance between the holder and the scoring knife frame and between the rotating blade and the holders.

What I claim:

1. A scoring knife comprising a flat blade holder having a circular opening therein extending in a direction normal to the flat surfaces of said holder, said holder having a plurality of slots communicating with said opening, a cylindrical journal movable in the direction of its axis into said opening, a pin fixed to said journal and adapted to be selectively received in one of said slots to prevent said journal from turning in said holder, and a scoring blade rotatably mounted on said journal.

2. A scoring knife comprising a flat blade holder having a circular opening therein extending in a direction normal to the flat surfaces of said holder, a pin fixed to said holder with a portion of said pin projecting into said opening, a cylindrical journal movable in the direction of its axis into said opening, a portion of the cylindrical surface of said journal having a plurality of depressions therein complementary to the projecting portion of said pin for selective engagement with said pin to prevent said journal from turning in said holder, and a scoring blade rotatably mounted on said journal.

HENRY DE SMITH.